(12) United States Patent
Zhao et al.

(10) Patent No.: US 12,236,703 B1
(45) Date of Patent: Feb. 25, 2025

(54) METHOD AND SYSTEM FOR FISH IDENTIFICATION BASED ON BODY SURFACE TEXTURE FEATURES AND GEOMETRIC FEATURES

(71) Applicant: Zhejiang University, Hangzhou (CN)

(72) Inventors: Jian Zhao, Hangzhou (CN); Feixiang Zhu, Hangzhou (CN); Haijun Li, Hangzhou (CN); Xiaofeng Qi, Hangzhou (CN); Ruiji Mahe, Hangzhou (CN); Zhangying Ye, Hangzhou (CN); Songming Zhu, Hangzhou (CN); Ying Liu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/930,296

(22) Filed: Oct. 29, 2024

(30) Foreign Application Priority Data

May 6, 2024 (CN) .......................... 202410549590.7

(51) Int. Cl.
*G06T 7/00* (2017.01)
*G06T 7/40* (2017.01)
(Continued)

(52) U.S. Cl.
CPC ................ *G06V 40/10* (2022.01); *G06T 7/40* (2013.01); *G06T 7/62* (2017.01); *G06V 10/776* (2022.01);
(Continued)

(58) Field of Classification Search
CPC ...... G06V 40/10; G06V 10/776; G06V 10/82; G06V 20/05; G06T 7/40; G06T 7/62; G06T 2207/20081; G06T 2207/20084
See application file for complete search history.

(56) References Cited

U.S. PATENT DOCUMENTS

2022/0004760 A1* 1/2022 Kozachenok .......... A01K 61/80
2023/0326226 A1* 10/2023 Ling ........................ G06T 7/62
382/181

FOREIGN PATENT DOCUMENTS

CN 114677606 A 6/2022
CN 115690452 A 2/2023

OTHER PUBLICATIONS

Chinese Patent Office Decision to Grant from application No. 202410549590.7 dated Jul. 12, 2024, 3 pgs.
(Continued)

*Primary Examiner* — Ping Y Hsieh
(74) *Attorney, Agent, or Firm* — Tutunjian & Bitetto, P.C.

(57) ABSTRACT

A method and system for fish identification based on body surface texture features and geometric features are provided. The method employs an improved Resnet network and a deep learning Yolov8 network to extract body surface texture features and geometric features of a fish on the basis of considering influences of fish tail swing and an oxygen concentration on a fish body form based on a small sample learning framework, and then realizes identity recognition of a fish individual by coupled analysis of the body surface texture features and the geometric features. The method can realize high-accuracy fish identification with few training samples of a fish to be identified from the perspective of actual application, provides theoretical basis and technical support for accurate fish stock assessment and accurate estimation of industrially farmed fish biomass, and meets the development requirements of modern agriculture.

9 Claims, 2 Drawing Sheets

(51) Int. Cl.
 *G06T 7/62* (2017.01)
 *G06V 10/776* (2022.01)
 *G06V 10/82* (2022.01)
 *G06V 20/05* (2022.01)
 *G06V 40/10* (2022.01)

(52) U.S. Cl.
 CPC .............. *G06V 10/82* (2022.01); *G06V 20/05* (2022.01); *G06T 2207/20081* (2013.01); *G06T 2207/20084* (2013.01)

(56) References Cited

OTHER PUBLICATIONS

Chinese Patent Application No. 202410549590.7 First Office Action, dated Jun. 13, 2024, 14 pgs.

* cited by examiner

METHOD AND SYSTEM FOR FISH IDENTIFICATION BASED ON BODY SURFACE TEXTURE FEATURES AND GEOMETRIC FEATURES

CROSS REFERENCE TO RELATED APPLICATION

This patent application claims the benefit and priority of Chinese Patent Application No. 2024105495907, filed with the China National Intellectual Property Administration on May 6, 2024, the disclosure of which is incorporated by reference herein in its entirety as part of the present application.

TECHNICAL FIELD

The present disclosure belongs to the fields of fish stock assessment and lossless measurement of industrially farmed fish biomass, and relates to a method and system for lossless accurate biomass measurement and individual identification of farmed fishes, and in particular, to a method and system for fish identification based on body surface texture features and geometric features.

BACKGROUND

Industrial farming has become an important trend of current aquaculture for its characteristics such as water saving, land saving, and high yield. Lossless measurement of fish school biomass is a key link of intelligent development of industrial farming. However, current lossless biomass measurement is fuzzy measurement. That is, only farming objects in front of a lens of a measurement device are measured. By this measurement method, the same object may be measured repeatedly, resulting in overfitting or local optimization of a measurement model. Fish face identification can effectively solve the above-mentioned dilemma. Repeated measurement can be effectively avoided by identity recognition of a measured object. In addition to industrial farming, fish face identification also plays an important role in fish stock assessment. However, there are few reports on existing related researches.

Deep learning facilitates solving of the above-mentioned problem. Scholars have conducted primary exploration on fish face identification using a simple convolutional neural network. However, limited by a network structure and performance, such a method has low accuracy and training thereof relies on a large number of samples. Thus, the method cannot be promoted to actual production scenarios.

In conclusion, the present disclosure proposes a method and system for fish face identification based on body surface texture features and geometric features. The method can realize identity recognition of individuals of a same fish by learning with small samples and coupling a body surface texture feature and a geometric feature of an object to be detected for analysis.

SUMMARY

An objective of the present disclosure is to provide a method and system for fish identification based on body surface texture features and geometric features to overcome the shortcomings of the prior art, providing theoretical basis and technical support for accurate fish stock assessment and accurate estimation of industrially farmed fish biomass.

The present disclosure adopts the following technical solutions:

A method for fish identification based on body surface texture features and geometric features includes: on the basis of considering influences of fish tail swing and an oxygen concentration on a fish body form, quantitatively extracting body surface texture features and geometric features of a fish using an improved Resnet network and a deep learning YoLo network, respectively, coupling the extracted body surface texture features and geometric features, and realizing identity recognition of individuals of a same fish using a small sample learning model.

In the above technical solution, further, the deep learning YoLo network is employed to automatically mark feature points of a fish individual in a current farming pond, and the geometric features of the fish individual are quantized based on the feature points in combination with the influences of the fish tail swing and the oxygen concentration on the fish body form.

Further, the feature points include basic feature points and optional feature points; the basic feature points include a fish body front endpoint, a fish tail midpoint, and a fish body center point, where the fish body front endpoint is a fish snout endpoint; the fish tail midpoint is a fish caudal fin base midpoint; and the fish body center point is an intersection point of a connecting line of the fish body front endpoint and the fish tail midpoint and a perpendicular line to a highest point of the fish body; the basic feature points further include an upper fish caudal fin base point, a lower fish caudal fin base point, the highest point of the fish body, and a lower intersection point of an extension of the perpendicular line and the fish body, where the fish tail midpoint is a midpoint of a connecting line of the upper fish caudal fin base point and the lower fish caudal fin base point; and the optional feature points are selected as needed. Further, the quantizing the geometric features includes:

obtaining fish body length information by quantization based on image feature points in combination with the influence of a fish tail swing frequency on the fish body form;

obtaining an actual Euclidean distance between the fish body center point and each of other feature points based on the image feature points in combination with the influence of the oxygen concentration on the fish body form, and obtaining a distance feature of feature points by normalization based on the actual Euclidean distance and the fish body length information; taking a connecting line of feature points, namely the fish body front endpoint and the fish body center point, in an image as a vector a and a connecting line of other feature point and the fish body center point as a vector $b_m$, and obtaining an included angle between the vectors a and $b_m$ based on a dot product and actual modulus lengths thereof to obtain an angle feature of the feature points; and performing a concat connection operation on the obtained distance feature and angle feature.

Further, the quantizing the geometric features specifically includes:

1) obtaining the distance feature of the feature points by normalization based on the actual Euclidean distance and the fish body length information:

detecting the fish tail swing frequency f, where when the fish tail swing frequency f is less than or equal to 0.5, the fish body length L is a Euclidean distance between feature points in the image, namely the fish body front endpoint p and the fish tail midpoint q: $\sqrt{(xp-xq)^2+(yp-yq)^2}$, denoted by L0;

and when the fish tail swing frequency f is greater than 0.5, the fish body length L is as follows:

$$L_i = \frac{x1}{x1 - x2\sin 2\Pi|f|}\sqrt{(xp-xq)^2 + (yp-yq)^2}$$

where $1 \leq i \leq N$, N being a number of farmed fish individuals in the current farming pond; $L_i$ represents a body length of an ith object; x1 represents a fish body width, which is a Euclidean distance between feature points, namely the highest point of the fish body and the lower intersection point; and x2 represents a fish tail width, which is a Euclidean distance between feature points, namely the upper fish caudal fin base point and the lower fish caudal fin base point;

for a feature point m in the image that is influenced by the oxygen concentration but not influenced by a fish tail bending degree, the actual Euclidean distance between the feature point and the fish body center point o is as follows:

$$d_{mo} = \frac{E1h}{2h1}\sqrt{(xm-xo)^2 + (ym-yo)^2}$$

for a feature point m in the image that is influenced by both the oxygen concentration and the fish tail bending degree, the actual Euclidean distance between the feature point and the fish body center point o is as follows:

$$d_{mo} = \frac{x1}{x1-x2\sin 2\Pi|f|}\frac{E1h}{2h1}\sqrt{(xm-xo)^2 + (ym-yo)^2},$$

where h1 represents a Euclidean distance between feature points in the image, namely the fish body center point and the highest point of the fish body; h represents a Euclidean distance between feature points in the image, namely the highest point of the fish body and a lowest point of the fish body; E1 represents an oxygen concentration of water when the fish body form is abnormal; and xo, yo, xm, and ym represent coordinates of the feature points, namely the fish body center point o and the feature point m, respectively;

the distance feature is thus obtained by quantization:

$$Z_{mo} = \frac{d_{mo}}{L_i}$$

2) taking the connecting line of the fish body front endpoint p and the fish body center point o as the vector a and the connecting line of other feature point m and the fish body center point o as the vector $b_m$, obtaining a radian $\theta'$ between the vector a and the vector $b_m$ according to the dot product and the actual modulus lengths of the two vectors, and converting the radian to an angle representation, thereby obtaining the angle feature $\theta$ of the feature points, where:

the actual modulus length of the vector a is as follows:

$$d1 = d_aE = d_a\frac{E1h}{2h1};$$

the actual modulus length of the vector of the vector $b_m$ is the actual Euclidean distance between the feature point m and the fish body center point o, denoted as d2; according to the radian angle $\theta'$ between the vector a and the vector $b_m$, a cosine value of the angle is as follows:

$$\cos\theta' = \left(\vec{a} \cdot \vec{b_m}\right)/d1 \times d2,$$

and the angle feature $\theta$ is obtained by quantization as follows:

$$\theta = \arccos(\cos\theta') \times (180/\Pi).$$

Further, the improved ResNet network is employed to quantize body surface texture features of a fish; the improvement is achieved by adding a convolutional block attention module (CBAM) module to a tail end of a ResNet model, and the CBAM module is changed from reducing dimensions first to increasing dimensions first and then reducing dimensions, and "cascade connection" of a channel attention module (CAM) and a spatial attention module (SAM) is changed to "parallel connection" while a ReLU activation function in the ResNet is replaced with a leaky ReLU activation function.

Further, the concat connection operation is performed on the obtained body surface texture features and geometric features; and assuming that channels for two branches of inputs of the body surface texture features and the geometric features are $X_1, X_2, \ldots, X_C$ and $Y_1, Y_2, \ldots, Y_C$, respectively, and in consideration of an influence of turbidity F factor, the channels of the two branches are coupled to obtain:

$$Z_{concat} = -(\tfrac{1}{2}F + \tfrac{1}{3})\Sigma_{i=1}^{c}X_i * K_i + \Sigma_{i=1}^{c}Y_i * K_{i+c}$$

where $K_i$ and $K_{i+c}$ represent convolution kernels corresponding to an ith channel and an (i+c)th channel known in the concat operation of a small sample learning network, respectively; and the fused multi-layer feature is used as an input to the small sample learning model.

Further, the small sample learning model is a small sample learning model based on a measurement network; a known dataset with the coupled body surface texture features and geometric features that have been obtained is prepared in advance; the small sample learning model based on the measurement network is pre-trained to obtain an embedded function that constructs identity mean centers with samples in a support set of a test set, then maps a sample in a validation set of the test set to an embedded space, and gives an identity probability of belonging to each fish individual by measuring a distance between the sample and each mean center, with an identity having a highest probability being a predicted identity of the sample.

A system for fish identification based on body surface texture features and geometric features includes: one or more processors; and
  a memory configured to store one or more programs,
  where the one or more processors, when executed by the one or more processors, cause the one or more processors to implement the method for fish identification based on body surface texture features and geometric features described above.

Further, the system further includes an underwater camera, a server, and a fill light, where the underwater camera and the fill light are mounted inside a farming pond and connected to the server; and the server is configured to trigger the underwater camera to read a real-time picture and implement the method described above.

Compared with the prior art, the present disclosure has at least the following beneficial effects: by selecting feature points and quantizing geometric features of a fish as well as taking influences of fish tail swing and an oxygen concentration on a fish body form and an influence of water turbidity in underwater shooting into full consideration, the geometric features of the fish body can be extracted more effectively, and a self-attention mechanism improved ResNet network is introduced to quantize the body surface texture features. The geometric features and the body surface texture features are coupled and then analyzed using a small sample learning model based on measurement. High-accuracy identity recognition of an individual of a same fish is realized. The method can realize high-accuracy fish identification with few training samples of a fish to be identified from the perspective of actual application, provides theoretical basis and technical support for accurate fish stock assessment and accurate estimation of industrially farmed fish biomass, and meets the development requirements of modern agriculture.

DETAILED DESCRIPTION OF THE EMBODIMENTS

To make the foregoing objectives, features, and advantages of the present disclosure clearer and more comprehensible, the specific implementations of the present disclosure are described in detail below with reference to the drawings. The following describes many details in order to provide a thorough understanding of the present disclosure. However, the present disclosure can be implemented in many other ways other than those described herein, and those skilled in the art can make similar improvements without departing from the connotation of the present disclosure, and thus the present disclosure is not limited to the specific embodiments disclosed below. The technical features in the embodiments of the present disclosure may be combined correspondingly under the premise of no conflict.

The present disclosure provides a method for fish identification based on body surface texture features and geometric features. The method firstly employs machine vision and deep learning techniques to quantize body surface texture features and geometric features of a fished farmed in circulating water, respectively, and then realizes coupled analysis of these features by means of a small sample learning network, and thus realizes accurate identity recognition of a fish individual.

Meanwhile, the present disclosure further provides a system for fish identification based on body surface texture features and geometric features. The system includes a underwater camera, a server, a fill light, a water temperature sensor, a turbidity sensor, etc. The underwater camera and the fill light are mounted inside a farming pond and connected to the server.

According to a particular embodiment of the present disclosure, the above-mentioned method/system includes or performs the following steps.

Figure 1:
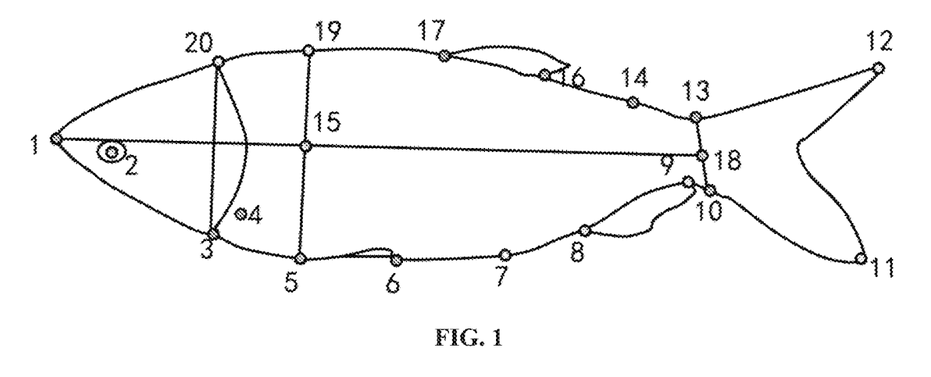
FIG. 1 is a schematic diagram of a distribution of feature points on a surface of a fish body in an embodiment of the present disclosure.
Figure 2:
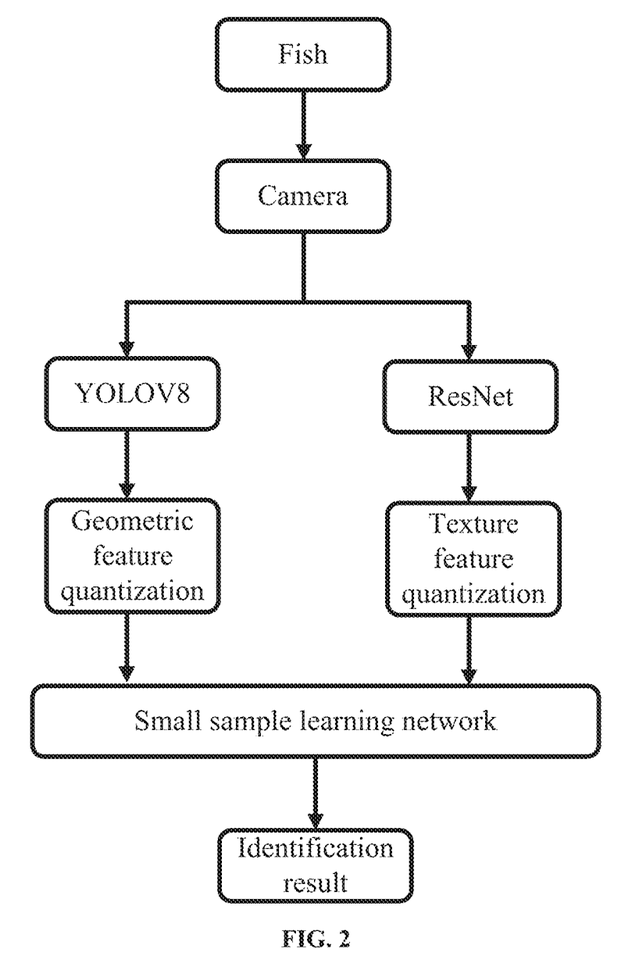
FIG. 2 is a flowchart of a method for fish identification based on body surface texture features and geometric features of the present disclosure.

(1) The server triggers the underwater camera to read a real-time picture, and automatically marks feature points of a fish individual in a current farming pond using a deep learning algorithm YoLov8. According to an example of the present disclosure, as shown in FIG. 1, 20 feature points (1, 2, 3, 4, 5, 6, 7, 8, 9, 10, 11, 12, 13, 14, 15, 16, 17, 18, 19, and 20) on the surface of the fish body are obtained. The feature point 1 is a fish mouth, i.e., a fish front endpoint; the feature point 18 is a fish tail midpoint, i.e., a fish caudal fin base midpoint, which is a midpoint of a connecting line of an upper fish caudal fin base point 13 and a lower fish caudal fin base point 10; in this way, an error caused by fish tail swing can be effectively prevented; a body length is calculated based on a distance from a snout to the caudal fin base midpoint; moreover, 19 is a highest point of the fish body; an intersection point of a connecting line of the fish body front endpoint and the fish tail midpoint and a perpendicular line to the highest point of the fish body is a fish body center point; a body width is calculated based on a height of a perpendicular line emanated from the highest point of the fish body, i.e., based on the feature point 19 and the feature point 5; and the feature point 15 is an intersection point of the body length and the body width, which is also a midpoint of the entire fish. These feature points are basic feature points, and other feature points are optional feature points which can be adjusted as needed or according to a fish type. In the example as shown in FIG. 1, the optional feature points may be selected as shown in the figure. For example, 2 is a fish eye; 3, 4, and 20 are 3 feature points of the fish head; 5, 6, 7, and 8 are 4 feature points of the pectoral fin; 9, 11, 12, and 14 are 4 feature points of the fish tail; and 16 and 17 are feature points of the dorsal fin. According to the above-mentioned distribution of the feature points, 20 feature points are manually marked on an acquired photo (two photos for each fish individual, and a total of 100 fish individuals). The marked photos are used for training on YoLov8 to obtain a corresponding network for subsequent automatic marking. The specific structure and the training manner of YoLov8 belong to the prior art, and can be implemented with reference to the related prior art, which will not be repeated here.

Individual body length (L) information of a fish school is obtained based on the obtained feature points.

Due to underwater shooting, in consideration of an influence of a fish tail swing frequency f on an individual body length of a fish body, the fish body may bend when the fish tail swings such that the obtained fish body length is less than an actual fish body length. Therefore, the actual fish body length is set to L, and a bent fish body length to L0, a bending degree to k, a fish body width to x1, and a fish tail width to x2, and the following formula is established:

$$k = \frac{x2}{x1}\sin 2\Pi |f| \quad (1)$$

where f may be measured by an existing method (which, for example, may be measured by YOLOV8); and |f| refers to ascertaining a value of the frequency with no consideration of units.

(1) When the fish tail swing frequency f is less than or equal to 0.5, the bending degree of the fish body may be ignored to obtain:

$L = L0$, $$L0 = \sqrt{(xp-xq)^2 + (yp-yq)^2} \quad (2)$$

(2) When the fish tail swing frequency f is greater than 0.5, the bending degree of the fish body is as follows:

$$K = \frac{L - L0}{L}, \quad (2)$$

and the actual fish body length is derived as follows:

$$L = \frac{L0}{1-k}. \quad (4)$$

A final calculation formula for the actual fish body length is obtained according to formulas (1), (2), (3), and (4) as follows:

$$L_i = \frac{x1}{x1 - x2\sin 2\Pi |f|} \sqrt{(xp-xq)^2 + (yp-yq)^2};$$

where $1 \leq i \leq N$, N being a number of farmed fish individuals in the current farming pond; $L_i$ represents a body length of an ith object; p and q are serial numbers of feature points; xp, yp, xq, and yq represent coordinates of the fish body front endpoint p and the feature point fish tail midpoint q, respectively. In this example, p, q=1, 2, ..., 20. Here, p is 18, and q is 1. The bent fish body length L0 is a Euclidean distance between the feature points 1 and 18.

(2) The geometric features of the fish are quantized.

It is assumed that the coordinates of a top left corner of a fish body image are (0, 0), and Euclidean distances between the fish body center point (the feature point 15) in the current farming pond and other feature points are separately calculated using Yolov8.

Due to underwater shooting, in consideration of an influence of an oxygen concentration on a fish body form, the oxygen concentration is E when the fish form is normal (which is the same as the state illustrated in FIG. 1), and the oxygen concentration is E1 in other forms (e.g., the head is facing up) (the oxygen concentration in this state may be measured in advance). When the oxygen concentration changes, the Euclidean distance between the feature points 15 and 19 is measured as h1 and the Euclidean distance between the feature points 5 and 19 is measured as h at this point, and the following formula can be established:

$$E1/E = \frac{h1}{h} / \frac{1}{2}$$

(where ½ refers to that the feature point 15 is the midpoint of the body width at the original oxygen concentration), and the following formula can be established:

$$E = \frac{E1h}{2h1}.$$

The actual Euclidean distances between the feature points 1, 2, 3, 4, 5, 6, 7, 8, 9, 14, 16, 17, 19, and 20, and the feature point 15 are calculated by the following formula:

$$d_{mo} = E\sqrt{(xm-xo)^2 + (ym-yo)^2} = \frac{E1h}{2h1}\sqrt{(xm-xo)^2 + (ym-yo)^2}$$

(these feature points are not influenced by the bending degree of the fish tail, but not influenced by the oxygen concentration). Here, m is selected from 1, 2, 3, 4, 5, 6, 7, 8, 9, 14, 16, 17, 19, and 20, and o is 15. The actual distances between the feature points 10, 11, 12, 13, and 18, and the feature point 15 are calculated by the following formula:

$$d_{mo} = \frac{x1}{x1 - x2\sin 2\Pi |f|} E\sqrt{(xm-xo)^2 + (ym-yo)^2}.$$

Therefore, the following formula is derived:

$$d_{mo} = \frac{x1}{x1 - x2\sin 2\Pi |f|} \frac{E1h}{2h1} \sqrt{(xm-xo)^2 + (ym-yo)^2}$$

(influenced by both the oxygen concentration and the bending degree of the fish tail). Here, m is selected from 10, 11, 12, 13, and 18, and o is 15. The actual Euclidean distances are normalized to obtain a geometric feature:

$$Z_{mo} = \frac{d_{mo}}{L},$$

where L represents the fish body length.

A connecting line of the feature points 1 and 15 is a vector a and a connecting line of other feature point and the feature point 15 is a vector $b_m$ (m is other feature point than 1 and 15), where vector $$\vec{a} = P_1 - P_{15} = (x_1 - x_{15}, y_1 - y_{15}),$$

and vector $$\vec{b_m} = P_m - P_{15} = (x_m - x_{15}, y_m - y_{15}).$$

A dot product and actual modulus lengths of the two vectors are calculated by the following formula:

$$\vec{a} \cdot \vec{b_m} = (x_1 - x_{15})(x_m - x_{15}) + (y_1 - y_{15})(y_m - y_{15}),$$

where the modulus length is a Euclidean distance: $d_{pq} = \sqrt{(xp-xq)^2 + (yp-yq)^2}$. Assuming that $d_a$ is a modulus length between the feature points 1 and 15, the actual modulus length is $$d1 = d_a E = d_a \frac{E1h}{2h1}.$$

With $d_{bm}$ as the modulus length between the feature points m and 15, the actual modulus length is $$d2 = d_{bm}E = d_{bm}\frac{E1h}{2h1},$$

where m is selected from the feature points 2, 3, 4, 5, 6, 7, 8, 9, 14, 16, 17, 19, and 20.

The actual modulus length is $$d2 = d_{bm}E\frac{x1}{x1 - x2\sin2\Pi|f|},$$

where m is selected from feature points 10, 11, 12, 13, and 18. Accordingly, a radian angle θ' between the vector a and the vector $b_m$ may be calculated, and a cosine value of the angle is as follows:

$$\cos\theta' = (\vec{a} \cdot \vec{b_m})/d1 \times d2$$

(d1 and d2 are the actual modulus length between the feature points 1 and 15 and the actual modulus length between other feature point m and the feature point 15, respectively). Finally, the calculated radian is converted to angle θ=arccos (cos θ')×(180/Π), thereby obtaining an angle feature.

A concat operation is performed on the obtained distance feature and angle feature to obtain a fused multi-layer feature (i.e., a geometric feature), and the geometric feature is coupled with a texture feature.

(3) The body surface texture features of a fish are quantized using an improved ResNet network. Due to underwater shooting, the influences of water turbidity and illumination intensity on fish body surface texture are taken into consideration. A convolutional block attention module (CBAM) module is added to a ResNet model to enhance the concern extent and the extraction capability of the model to fish body texture features. CBAM is changed from reducing dimensions first to increasing dimensions first and then reducing dimensions, and "cascade connection" of a CAM and a SAM is changed to "parallel connection", where formulas of channel attention and spatial attention are as follows:

$Mc(F)=U(MLP(AvgPool(F)+MLP(MaxPool(F))=u$
$(W1(W2(F^c_{avg}))+W1(W0(Fc \max)$ $Ms(F)=U(f^{7\times 7}[AvgPool(F); MaxPool(F)])=u(f^{7\times 7}$
$([F^S_{avg};F^S_{max}]))$ A RELU activation function in the ResNet is replaced with a leaky ReLU activation function. The Leaky ReLU is an excellent variant of the ReLU. When x<0, a negative gradient value is obtained. The problem of ReLU nerve death is solved.

The CBAM module is added to a tail end of a ResNet module. More information features can be extracted through the foregoing convolution operation. An extracted feature map is put into the CBAM, allowing the network to adaptively acquire the texture information of fish individuals. An output weighted feature information matrix and an input feature information matrix are added up to reduce related feature information lost in the convolution process. Finally, the added feature map is subjected to leaky Relu non-linear activation once to obtain a final output result which is sent to a small sample learning network.

(4) Small sample learning is performed using a small sample learning model based on measurement. Concat operation is performed on the obtained surface texture feature and geometric feature (the concat operation is to directly connect two original features). Assuming that channels for two branches of inputs of the body surface texture features and the geometric features are $X_1, X_2, \ldots, X_C$ and $Y_1, Y_2, \ldots, Y_C$, respectively, a single output of concat is $Z_{concat}=\Sigma_{i=1}^c X_i*K_i+\Sigma_{i=1}^c Y_i*K_{i+c}$, where $K_i$ and $K_{i+c}$ represent convolution kernels corresponding to an ith channel and an (i+c)th channel known in the concat operation of the small sample learning network, respectively. Due to underwater shooting, in consideration of the influence of turbidity F factor, when the turbidity increases, the obtained texture definition (Q) decreases, and the following formula can be established:

Q=−(½F+⅓). Then, the final output is as follows:

$Z_{concat}=Q\Sigma_{i=1}^c X_i*K_i+\Sigma_{i=1}^c Y_i*K_{i+c}=Z_{concat}=-(½F+⅓)$
$\Sigma_{i=1}^c X_i*K_i+\Sigma_{i=1}^c Y_i*K_{i+c}$.

Figure 3:
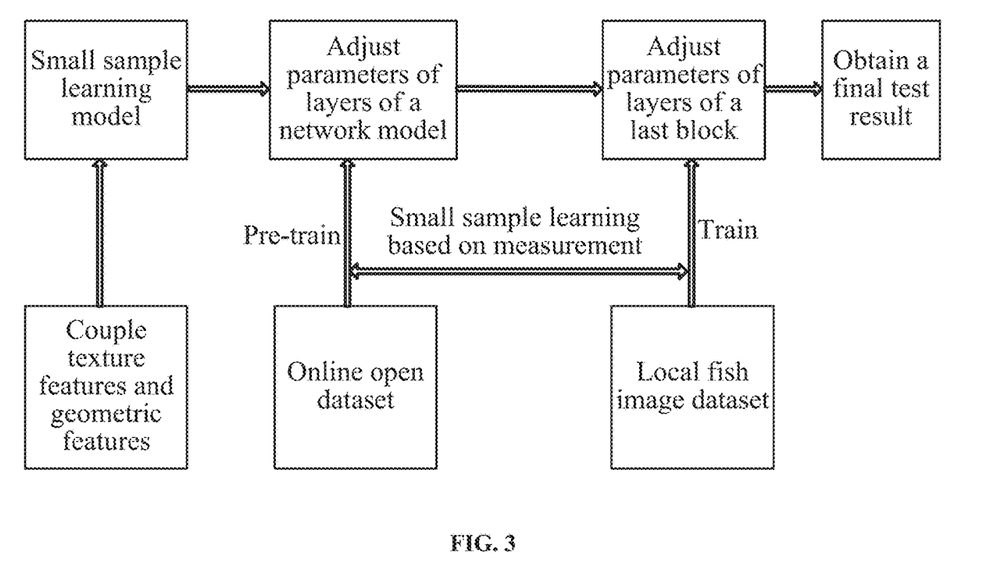
FIG. 3 is a flowchart of small sample learning of the present disclosure.

The obtained fused multi-layer feature output is used as a model input, and then the model input is mapped to an embedded space through a network model for fish identity recognition, and a final result is obtained, as shown in FIG. 3.

Application Case:

Fish identification testing is conducted on industrially farmed *Acrossocheilus fasciatus* (1000 individuals) and spotted maigre (800 individuals) using the experimental method disclosed herein, and comparison is made with other network models to verify the effectiveness of the method. Identification results are as shown in the table.

|  | Accuracy rate | |
| --- | --- | --- |
|  | Grouper | Spotted maigre |
| ConvNeXt | 72.13 | 69.06 |
| AlexNet | 68.24 | 62.12 |
| VGG16 | 79.55 | 78.65 |
| Method of the present disclosure | 90.7 | 88.27 |

It can be seen that compared with some existing detection networks, the method of the present disclosure can identify individuals of the same fish more accurately, and has good effects for different fishes.

Moreover, a person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Furthermore, the present disclosure may adopt a form of a computer program product that is implemented on one or more computer-usable storage media (including but not limited to a disk memory, compact disc read-only memory (CD-ROM) and an optical memory) that include computer program codes.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The above described are merely preferred embodiments of the present disclosure, and are not intended to limit the present disclosure. Various changes and variations can be made by those of ordinary skill in the related technical field without departing from the spirit and scope of the present disclosure. All technical solutions obtained by means of equivalent replacements or equivalent variations should fall within the protection scope of the present disclosure.

What is claimed is:

1. A method for fish identification based on body surface texture features and geometric features, comprising: on the basis of considering influences of fish tail swing and an oxygen concentration on a fish body form, quantitatively extracting body surface texture features and geometric features of a fish using an improved Resnet network and a deep learning YoLo network, respectively, coupling the extracted body surface texture features and geometric features, and realizing identity recognition of individuals of a same fish using a small sample learning model;

wherein the deep learning YoLo network is employed to automatically mark feature points of a fish individual in a current farming pond, and the geometric features of the fish individual are quantized based on the feature points in combination with the influences of the fish tail swing and the oxygen concentration on the fish body form; the feature points comprise basic feature points and optional feature points; the basic feature points comprise a fish body front endpoint, a fish tail midpoint, and a fish body center point, wherein the fish body front endpoint is a fish snout endpoint; the fish tail midpoint is a fish caudal fin base midpoint; and the fish body center point is an intersection point of a connecting line of the fish body front endpoint and the fish tail midpoint and a perpendicular line to a highest point of the fish body; the basic feature points further comprise an upper fish caudal fin base point, a lower fish caudal fin base point, the highest point of the fish body, and a lower intersection point of an extension of the perpendicular line and the fish body, wherein the fish tail midpoint is a midpoint of a connecting line of the upper fish caudal fin base point and the lower fish caudal fin base point; and the optional feature points are selected as needed;

the quantizing the geometric features comprises:
obtaining fish body length information by quantization based on image feature points in combination with the influence of a fish tail swing frequency on the fish body form;
obtaining an actual Euclidean distance between the fish body center point and each of other feature points based on the image feature points in combination with the influence of the oxygen concentration on the fish body form, and obtaining a distance feature of feature points by normalization based on the actual Euclidean distance and the fish body length information; taking a connecting line of feature points, namely the fish body front endpoint and the fish body center point, in an image as a vector a and a connecting line of other feature point and the fish body center point as a vector $b_m$, and obtaining an included angle between the vectors a and $b_m$ based on a dot product and actual modulus lengths thereof to obtain an angle feature of the feature points; and performing a concat connection operation on the obtained distance feature and angle feature;

the quantizing the geometric features specifically comprises:

1) obtaining the distance feature of the feature points by normalization based on the actual Euclidean distance and the fish body length information:
detecting the fish tail swing frequency f, wherein when the fish tail swing frequency f is less than or equal to 0.5, the fish body length L is a Euclidean distance between feature points in the image, namely the fish body front endpoint p and the fish tail midpoint q: $\sqrt{(xp-xq)^2+(yp-yq)^2}$, denoted by L0; and when the fish tail swing frequency f is greater than 0.5, the fish body length L is as follows:

$$L_i = \frac{x1}{x1 - x2\sin2\Pi|f|}\sqrt{(xp-xq)^2 + (yp-yq)^2};$$

wherein $1 \le i \le N$, N being a number of farmed fish individuals in the current farming pond; $L_i$ represents a body length of an ith object; x1 represents a fish body width, which is a Euclidean distance between feature points, namely the highest point of the fish body and the lower intersection point; and x2 represents a fish tail width, which is a Euclidean distance between feature points, namely the upper fish caudal fin base point and the lower fish caudal fin base point;

for a feature point m in the image that is influenced by the oxygen concentration but not influenced by a fish tail bending degree, the actual Euclidean distance between the feature point and the fish body center point o is as follows:

$$d_{mo} = \frac{E1h}{2h1}\sqrt{(xm-xo)^2 + (ym-yo)^2};$$

for a feature point m in the image that is influenced by both the oxygen concentration and the fish tail bending degree, the actual Euclidean distance between the feature point and the fish body center point o is as follows:

$$d_{mo} = \frac{x1}{x1 - x2\sin 2\Pi |f|} \frac{E1h}{2h1} \sqrt{(xm-xo)^2 + (ym-yo)^2};$$

wherein h1 represents a Euclidean distance between feature points in the image, namely the fish body center point and the highest point of the fish body; h represents a Euclidean distance between feature points in the image, namely the highest point of the fish body and a lowest point of the fish body; E1 represents an oxygen concentration of water when the fish body form is abnormal; and xo, yo, xm, and ym represent coordinates of the feature points, namely the fish body center point o and the feature point m, respectively;

the distance feature is thus obtained by quantization:

$$Z_{mo} = \frac{d_{mo}}{L_i};$$

2) taking the connecting line of the fish body front endpoint p and the fish body center point o as the vector a and the connecting line of other feature point m and the fish body center point o as the vector $b_m$, obtaining a radian θ' between the vector a and the vector $b_m$ according to the dot product and the actual modulus lengths of the two vectors, and converting the radian to an angle representation, thereby obtaining the angle feature θ of the feature points, wherein:

the actual modulus length of the vector a is as follows:

$$d1 = d_a E = d_a \frac{E1h}{2h1};$$

the actual modulus length of the vector of the vector $b_m$ is the actual Euclidean distance between the feature point m and the fish body center point o, denoted as d2;

according to the radian angle θ' between the vector a and the vector $b_m$, a cosine value of the angle is as follows:

$$\cos\theta' = (\vec{a} \cdot \vec{b_m})/d1 \times d2,$$

and the angle feature θ is obtained by quantization as follows:

θ=arccos(cos θ')×(180/Π).

2. The method for fish identification based on body surface texture features and geometric features according to claim 1, wherein the improved ResNet network is employed to quantize body surface texture features of a fish; the improvement is achieved by adding a convolutional block attention module (CBAM) module to a tail end of a ResNet model, and the CBAM module is changed from reducing dimensions first to increasing dimensions first and then reducing dimensions, and "cascade connection" of a channel attention module (CAM) and a spatial attention module (SAM) is changed to "parallel connection" while a ReLU activation function in the ResNet is replaced with a leaky ReLU activation function.

3. The method for fish identification based on body surface texture features and geometric features according to claim 1, wherein the concat connection operation is performed on the obtained body surface texture features and geometric features; and assuming that channels for two branches of inputs of the body surface texture features and the geometric features are $X_1$, $X_2$, . . . , $X_C$ and $Y_1$, $Y_2$, . . . , $Y_C$, respectively, and in consideration of an influence of turbidity F factor, the channels of the two branches are coupled to obtain:

$$Z_{concat} = -(\tfrac{1}{2}F + \tfrac{1}{3})\Sigma_{i=1}{}^c X_i * K_i + \Sigma_{i=1}{}^c Y_i * K_{i+c};$$

wherein $K_i$ and $K_{i+c}$ represent convolution kernels corresponding to an ith channel and an (i+c)th channel known in the concat operation of a small sample learning network, respectively; and the coupled multi-layer feature is used as an input to the small sample learning model.

4. The method for fish identification based on body surface texture features and geometric features according to claim 1, wherein the small sample learning model is a small sample learning model based on a measurement network; a known dataset with the coupled body surface texture features and geometric features that have been obtained is prepared in advance; the small sample learning model based on the measurement network is pre-trained to obtain an embedded function that constructs identity mean centers with samples in a support set of a test set, then maps a sample in a validation set of the test set to an embedded space, and gives an identity probability of belonging to each fish individual by measuring a distance between the sample and each mean center, with an identity having a highest probability being a predicted identity of the sample.

5. A system for fish identification based on body surface texture features and geometric features, comprising: one or more processors; and
   a memory configured to store one or more programs;
   wherein the one or more processors, when executed by the one or more processors, cause the one or more processors to implement the method for fish identification based on body surface texture features and geometric features according to claim 1.

6. The system for fish identification based on body surface texture features and geometric features according to claim 5, wherein the improved ResNet network is employed to quantize body surface texture features of a fish; the improvement is achieved by adding a convolutional block attention module (CBAM) module to a tail end of a ResNet model, and the CBAM module is changed from reducing dimensions first to increasing dimensions first and then reducing dimensions, and "cascade connection" of a channel attention module (CAM) and a spatial attention module (SAM) is changed to "parallel connection" while a ReLU activation function in the ResNet is replaced with a leaky ReLU activation function.

7. The system for fish identification based on body surface texture features and geometric features according to claim 5, wherein the concat connection operation is performed on the obtained body surface texture features and geometric features; and assuming that channels for two branches of inputs of the body surface texture features and the geometric features are $X_1$, $X_2$, . . . , $X_C$ and $Y_1$, $Y_2$, . . . , $Y_C$, respectively, and in consideration of an influence of turbidity F factor, the channels of the two branches are coupled to obtain:

$$Z_{concat} = -(\tfrac{1}{2}F + \tfrac{1}{3})\Sigma_{i=1}{}^c X_i * K_i + \Sigma_{i=1}{}^c Y_i * K_{i+c};$$

wherein $K_i$ and $K_{i+c}$ represent convolution kernels corresponding to an ith channel and an (i+c)th channel known in the concat operation of a small sample learning network, respectively; and the coupled multilayer feature is used as an input to the small sample learning model.

8. The system for fish identification based on body surface texture features and geometric features according to claim 5, wherein the small sample learning model is a small sample learning model based on a measurement network; a known dataset with the coupled body surface texture features and geometric features that have been obtained is prepared in advance; the small sample learning model based on the measurement network is pre-trained to obtain an embedded function that constructs identity mean centers with samples in a support set of a test set, then maps a sample in a validation set of the test set to an embedded space, and gives an identity probability of belonging to each fish individual by measuring a distance between the sample and each mean center, with an identity having a highest probability being a predicted identity of the sample.

9. The system for fish identification based on body surface texture features and geometric features according to claim 5, comprising an underwater camera, a server, and a fill light, wherein the underwater camera and the fill light are mounted inside a farming pond and connected to the server; and the server is configured to trigger the underwater camera to read a real-time picture and implement a method for fish identification based on body surface texture features and geometric features, the method comprising: on the basis of considering influences of fish tail swing and an oxygen concentration on a fish body form, quantitatively extracting body surface texture features and geometric features of a fish using an improved Resnet network and a deep learning YoLo network, respectively, coupling the extracted body surface texture features and geometric features, and realizing identity recognition of individuals of a same fish using a small sample learning model;

wherein the deep learning YoLo network is employed to automatically mark feature points of a fish individual in a current farming pond, and the geometric features of the fish individual are quantized based on the feature points in combination with the influences of the fish tail swing and the oxygen concentration on the fish body form; the feature points comprise basic feature points and optional feature points; the basic feature points comprise a fish body front endpoint, a fish tail midpoint, and a fish body center point, wherein the fish body front endpoint is a fish snout endpoint; the fish tail midpoint is a fish caudal fin base midpoint; and the fish body center point is an intersection point of a connecting line of the fish body front endpoint and the fish tail midpoint and a perpendicular line to a highest point of the fish body; the basic feature points further comprise an upper fish caudal fin base point, a lower fish caudal fin base point, the highest point of the fish body, and a lower intersection point of an extension of the perpendicular line and the fish body, wherein the fish tail midpoint is a midpoint of a connecting line of the upper fish caudal fin base point and the lower fish caudal fin base point; and the optional feature points are selected as needed;

the quantizing the geometric features comprises:
obtaining fish body length information by quantization based on image feature points in combination with the influence of a fish tail swing frequency on the fish body form;
obtaining an actual Euclidean distance between the fish body center point and each of other feature points based on the image feature points in combination with the influence of the oxygen concentration on the fish body form, and obtaining a distance feature of feature points by normalization based on the actual Euclidean distance and the fish body length information; taking a connecting line of feature points, namely the fish body front endpoint and the fish body center point, in an image as a vector a and a connecting line of other feature point and the fish body center point as a vector $b_m$, and obtaining an included angle between the vectors a and $b_m$ based on a dot product and actual modulus lengths thereof to obtain an angle feature of the feature points; and performing a concat connection operation on the obtained distance feature and angle feature;

the quantizing the geometric features specifically comprises:
1) obtaining the distance feature of the feature points by normalization based on the actual Euclidean distance and the fish body length information:
detecting the fish tail swing frequency f, wherein when the fish tail swing frequency f is less than or equal to 0.5, the fish body length L is a Euclidean distance between feature points in the image, namely the fish body front endpoint p and the fish tail midpoint q: $\sqrt{(xp-xq)^2+(yp-yq)^2}$, denoted by L0; and when the fish tail swing frequency f is greater than 0.5, the fish body length L is as follows:

$$L_i = \frac{x1}{x1 - x2\sin 2\Pi|f|} \sqrt{(xp-xq)^2 + (yp-yq)^2};$$

wherein $1 \leq i \leq N$, N being a number of farmed fish individuals in the current farming pond; $L_i$ represents a body length of an ith object; x1 represents a fish body width, which is a Euclidean distance between feature points, namely the highest point of the fish body and the lower intersection point; and x2 represents a fish tail width, which is a Euclidean distance between feature points, namely the upper fish caudal fin base point and the lower fish caudal fin base point;

for a feature point m in the image that is influenced by the oxygen concentration but not influenced by a fish tail bending degree, the actual Euclidean distance between the feature point and the fish body center point o is as follows:

$$d_{mo} = \frac{E1h}{2h1} \sqrt{(xm-xo)^2 + (ym-yo)^2};$$

for a feature point m in the image that is influenced by both the oxygen concentration and the fish tail bending degree, the actual Euclidean distance between the feature point and the fish body center point o is as follows:

$$d_{mo} = \frac{x1}{x1 - x2\sin 2\Pi|f|} \frac{E1h}{2h1} \sqrt{(xm-xo)^2 + (ym-yo)^2};$$

wherein h1 represents a Euclidean distance between feature points in the image, namely the fish body center point and the highest point of the fish body; h represents a Euclidean distance between feature points in the image, namely the highest point of the fish body and a lowest point of the fish body; E1 represents an oxygen concentration of water when the fish body form is abnormal; and xo, yo, xm, and ym represent coordinates of the feature points, namely the fish body center point o and the feature point m, respectively;

the distance feature is thus obtained by quantization:

$$Z_{mo} = \frac{d_{mo}}{L_i};$$

2) taking the connecting line of the fish body front endpoint p and the fish body center point o as the vector a and the connecting line of other feature point m and the fish body center point o as the vector $b_m$, obtaining a radian $\theta'$ between the vector a and the vector $b_m$ according to the dot product and the actual modulus lengths of the two vectors, and converting the radian to an angle representation, thereby obtaining the angle feature $\theta$ of the feature points, wherein:

the actual modulus length of the vector a is as follows:

$$d1 = d_a E = d_a \frac{E1h}{2h1};$$

the actual modulus length of the vector of the vector $b_m$ is the actual Euclidean distance between the feature point m and the fish body center point o, denoted as d2;

according to the radian angle $\theta'$ between the vector a and the vector $b_m$, a cosine value of the angle is as follows:

$$\cos\theta' = (\vec{a} \cdot \vec{b_m})/d1 \times d2,$$

and the angle feature $\theta$ is obtained by quantization as follows:

$\theta = \arccos(\cos\theta') \times (180/\Pi)$.

* * * * *